Patented Sept. 19, 1922.

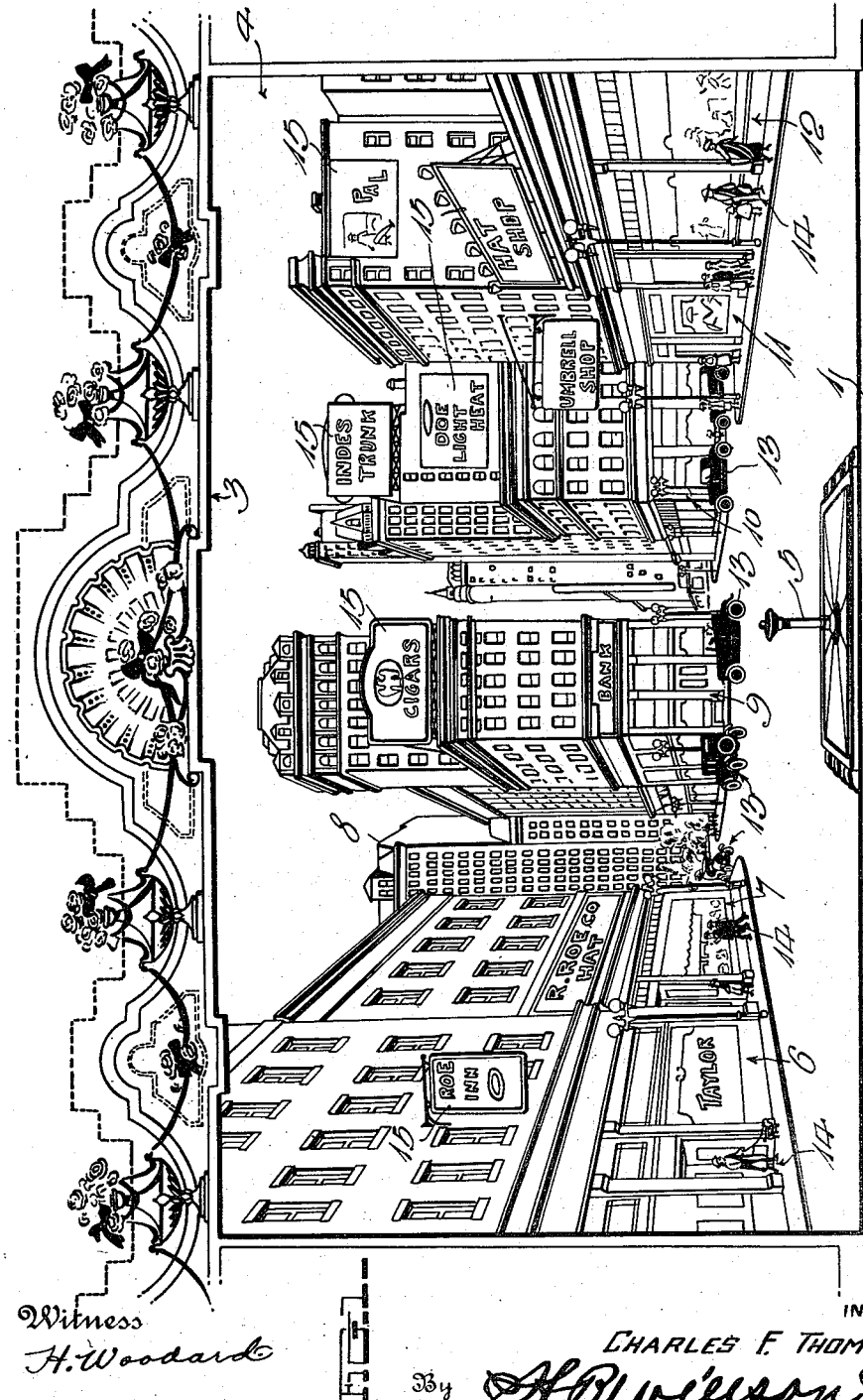

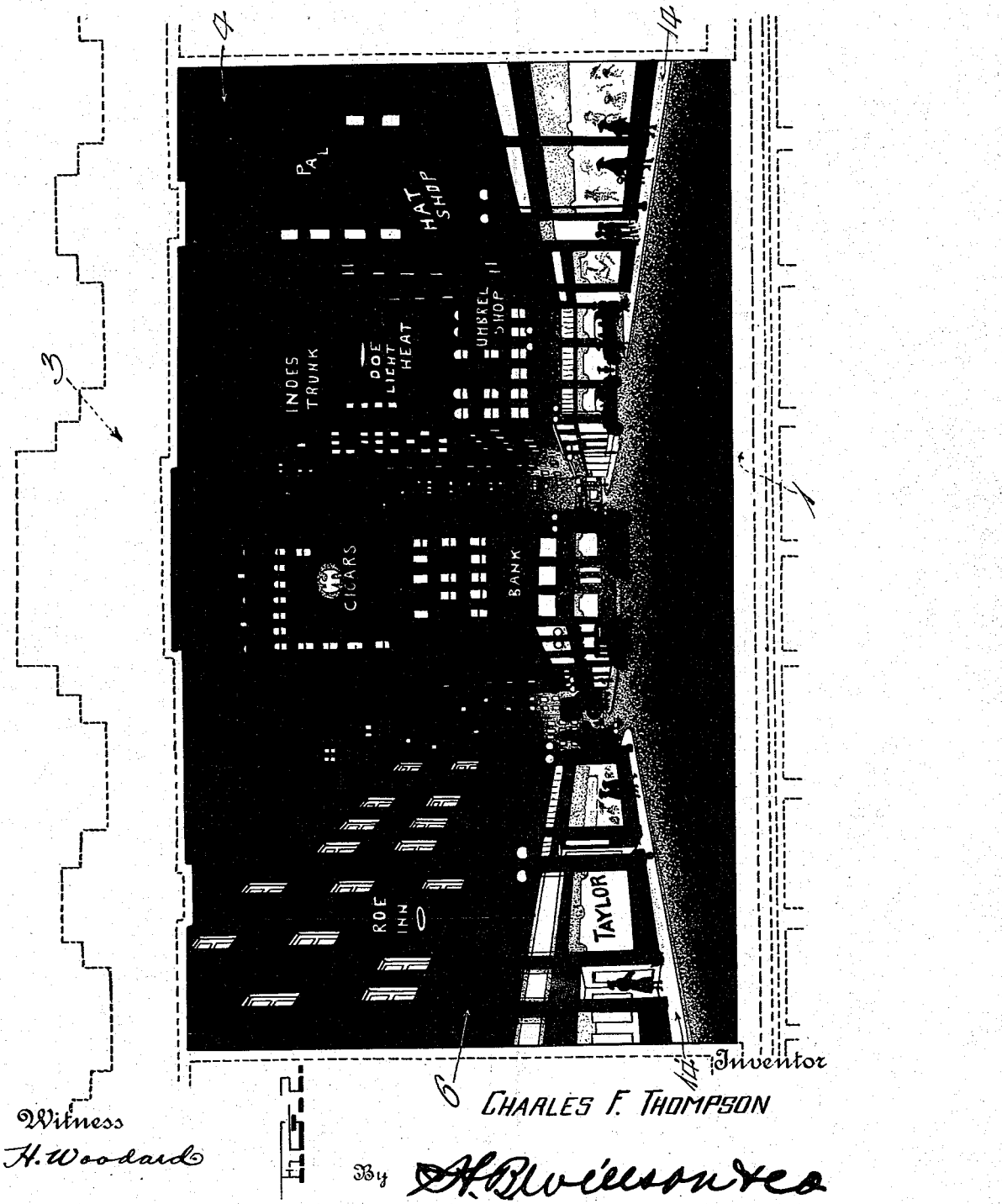

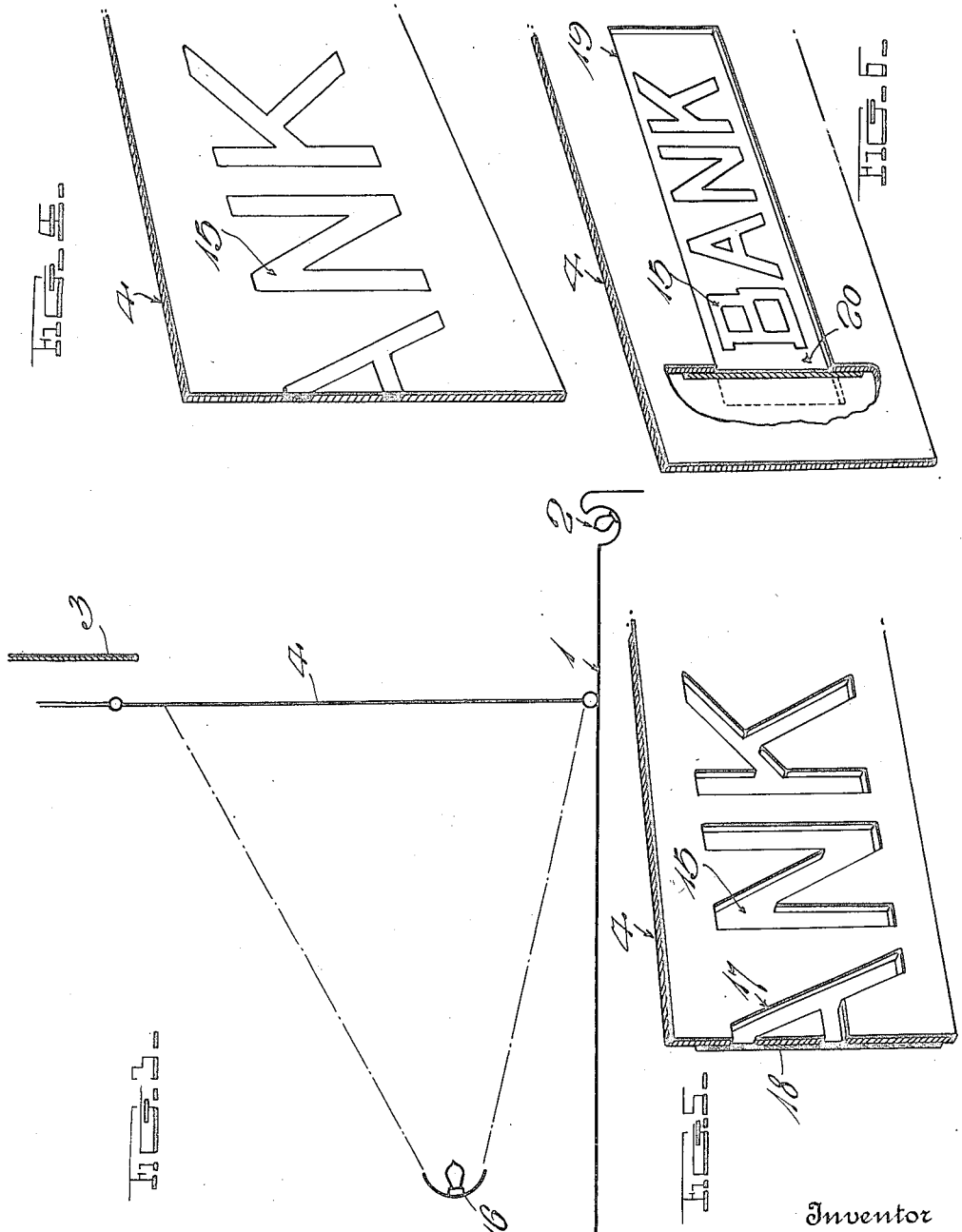

1,429,802

UNITED STATES PATENT OFFICE

CHARLES F. THOMPSON, OF LOS ANGELES, CALIFORNIA.

ADVERTISING CURTAIN FOR THEATERS.

Application filed March 4, 1922. Serial No. 541,106.

*To all whom it may concern:*

Be it known that I, CHARLES F. THOMPSON, a citizen of the United States, residing at Los Angeles, in the county of Los Angeles and State of California, have invented certain new and useful Improvements in Advertising Curtains for Theaters; and I do declare the following to be a full, clear, and exact description of the invention, such as will enable others skilled in the art to which it appertains to make and use the same.

The present invention relates to a means and method for producing scenic advertisements in theaters and similar places, and its object is to provide a curtain which is so painted or printed and constructed that when it is illuminated from the front, it will present a scene containing advertisements as it would appear under daylight conditions and when it is illuminated from the rear, it will present the same scene as it would appear under night conditions. The curtain is therefore a combination day and night scenic curtain, and was designed for the purpose of taking the place of separate day and night curtains and also for the purpose of simplifying and improving upon the construction of the latter.

In the accompanying drawings practical embodiments of the invention are illustrated.

In the drawings:

Fig. 1 is a front view of a curtain constructed in accordance with the invention and illustrating it as being illuminated from the front to represent the scene depicted thereon under daylight conditions;

Fig. 2 is a similar view illustrating the curtain as being illuminated from the back to represent the same scene under night conditions;

Fig. 3 is a diagrammatic vertical sectional view from the front to the rear of a stage or platform of a theater or the like, illustrating the curtain in place in the opening in the proscenium arch and the illuminating devices therefor;

Fig. 4 is a perspective view of a portion of a curtain constructed in accordance with the invention, illustrating one manner in which the advertising matter may be arranged upon it;

Fig. 5 is a similar view illustrating another way in which the advertising matter may be arranged upon the curtain; and Fig. 6 is a perspective view of a portion of a curtain in which the entire advertising signs are removable so that they can be replaced by other advertising matter if desired.

In the drawings above briefly described, the numeral 1 represents the stage or platform of a theater or the like having footlights 2, and 3 represents the proscenium arch, behind which a curtain 4 constructed in accordance with the invention is suspended by suitable devices and may be raised or lowered as desired. When the curtain is lowered, it will occupy and fill the opening formed by the proscenium arch so that it may be viewed by the audience.

The front of the curtain 4, that is, the side of the curtain which is adjacent the audience, has painted, printed or otherwise depicted thereon a scene in which a number of advertising signs are illustrated. In the drawings, the scene upon the front of the curtain depicts a city view where a number of streets intersect. In the scene a fountain 5 is shown in the foreground and store and office buildings 6, 7, 8, 9, 10, 11 and 12 are shown fronting upon the various streets. The scene is made more realistic by illustrating vehicles 13 upon the streets and pedestrians 14 upon the sidewalks. Numerous of the store and office buildings have advertising signs suspended therefrom or erected thereon, and in one instance advertising matter appears upon one of the store windows. Some of the signs 15 may be of the illuminating type.

To represent the scene under daylight conditions, the curtain 4 is illuminated from the front, for instance, by the footlights 2. When, however, it is desired to represent the scene under night conditions, the footlights 2 or means for illuminating the curtain from the front, are turned out, and the curtain is illuminated from the rear in any suitable manner, as by a spotlight 16. In order to permit the rays of the light 16 to be seen by the audience, portions of the curtain are made of translucent or transparent material. The portions of the curtain which are made of translucent or transparent material, are those portions which are desired to be seen when the curtain is illuminated from the rear, and since it is desired to present the scene under night conditions, the translucent or transparent portions of the curtain are those portions upon which certain of the signs, office and store windows are depicted; and where reflected light is to be shown, for instance, upon the side walks 14' and portions of the streets in front of the lighted store windows, those portions of the curtain are made of translucent material of varying density to produce the desired effect. Thus, when the footlights 2 are turned out and the spotlight 16 is turned on, the scene presented to the audience will be somewhat as illustrated in Fig. 2, and from this view, it will be noted that the advertising signs present the appearance of being illuminated.

When the curtain 4 is illuminated from the front so as to present the scene depicted thereon under daylight conditions as shown in Fig. 1 and when illuminated from the rear so as to represent the scene under night conditions as shown in Fig. 2, the signs and display windows, etc. are plainly visible to the audience. It will therefore be seen that by alternately lighting the curtain from the front and from the rear, the advertising matter may be given continuous display and its effect upon the audience may be increased by changing its appearance to correspond with the different conditions of day and night.

The invention is especially desirable and useful in theaters or places of entertainment where advertising matter may be displayed between the acts, because the scene depicted upon the curtain may be an exact representation of a street scene in the city in which the curtain is used and the advertising matter or signs depicted upon the curtain may be exact representations of those actually used by the advertisers. An advertiser's place of business with its environment in the business district may be depicted upon the curtain and the signs may be shown in association with their actual surroundings.

The curtain may be of any desired form and may be made of any suitable material capable of being provided with an opaque field and translucent or transparent portions or spots which may be of varied translucency to provide lights and shadows as well as signs of different brightness or character.

In Fig. 4, wherein a portion of one of the signs of the curtain is shown, the field or body of the sign is of opaque material and the letters forming the sign are rendered translucent or transparent by treating the portions of the curtain upon which the letters are depicted with some substance which will render those portions translucent or transparent. The same general result may be obtained as shown in Fig. 5 by cutting out the letters and the other portions of the curtain which are to be seen when the night scene is presented and then covering the openings 17 thus formed with pieces of translucent or transparent material 18. These pieces or strips of translucent or transparent material may be glued, stitched or otherwise secured to the rear side of the curtain and may be painted as desired upon their front sides.

It very often happens that the advertising matter upon the signs of the curtain has or is desired to be changed. It is therefore desirable to make the portions of the curtain occupied by the signs removable. This may be done by cutting openings 19 into the curtain at the places occupied by the signs. The openings 19 should be of the size and shape of the signs. The advertising matter for the signs in this case is placed upon sheets 20 which are glued, sewed or otherwise suitably secured to the rear side of the curtain behind the openings 19 and these sheets 20 have opaque and translucent or transparent portions and are painted or printed or otherwise made so as to represent the signs themselves and so as to be visible to the audience when either day and night effects are produced.

It is obvious that other ways of constructing the curtain with opaque and translucent or transparent portions may be employed instead of the foregoing described ways.

The alternate illumination of the curtain from the front and from the rear will represent the appearance of the same scene by day and by night and will show or produce a complete simulation of the scene represented under the varying conditions of daylight and darkness without changing or shifting the curtain itself or any portion thereof. The single curtain therefore provides representations of the same scene under day and night conditions, and the change of lighting by the illuminating means makes the advertising signs appear as under actual daylight and night conditions.

From the foregoing description taken in connection with the accompanying drawings, the construction, use and advantages of the invention will be readily understood.

It is obvious that numerous changes in form, proportion and in the details of construction may be resorted to without departing from the spirit and principle of the invention, and hence it is to be understood that such changes may be made within the meaning and scope of the following claims.

What is claimed is:

1. An advertising curtain for theaters and the like comprising a sheet having opaque and translucent portions, the translucent portions of said sheet being shaped and arranged over the area thereof in simulation of lighted parts of illuminating advertising signs and of a night scene; so that said sheet will present when viewed from the one side and illuminated from the other side a night scene in which rays of light will actually propagate from said translucent portions representing said lighted parts.

2. An advertising curtain for theaters and the like comprising a sheet having opaque and translucent portions, the translucent portions of said sheet being shaped and arranged over the area thereof in simulation of lighted parts of illuminating advertising signs and of a night scene and in simulation of parts of said scene representing light reflecting surfaces, some of the translucent portions of said sheet including some of those simulating light reflecting surfaces in said scene being of varied density; whereby said sheet will present when viewed from one side and illuminated from the other side a night scene in which rays of light will actually propagate from said translucent portions.

3. An advertising curtain for theaters and the like comprising a sheet, a scene depicted upon the front side of said sheet, said scene including simulations of light producing objects and illuminating advertising signs having sources of light, the portions of said sheet occupied by said simulations of light producing objects and sources of light being translucent and the remaining portions of said sheet being opaque; whereby said sheet when viewed and illuminated from the front, will present said scene under daylight conditions with said simulations of the light producing objects and the sources of light represented as being extinguished, and when viewed from the front and illuminated from the rear will present said scene under night conditions with said simulations of the light producing objects and the sources of light represented as propagating rays of light.

4. An advertising curtain for theaters and the like comprising a sheet, a scene depicted upon the front side of said sheet, said scene including simulations of light producing objects and illuminating advertising signs having sources of light, the portions of said sheet occupied by said simulations of light producing objects and sources of light being translucent, the portions of said sheet occupied by portions of said scene which represent light reflecting surfaces also being translucent, the remaining portions of said sheet being opaque, some of the translucent portions of said sheet including some of those occupied by the portions of said scene which represent light reflecting surfaces being of varied density; whereby said sheet, when viewed and illuminated from the front. will present said scene under daylight conditions with said simulations of the light producing objects and the sources of light represented as being extinguished, and when viewed from the front and illuminated from the rear will present said scene under night conditions with said simulations of the light producing objects and the sources of light represented as propagating rays of light.

5. An advertising curtain for theaters or the like comprising an opaque sheet having a scene depicted upon the front side thereof, said scene including simulations of illuminating signs, the portions of said sheet occupied by said signs being cutout, and strips secured to the rear side of said sheet behind said cutout portions thereof, said strips having translucent and opaque portions arranged to simulate advertising matter for the signs and being removable and replaceable by other strips having other advertising matter.

In testimony whereof I have hereunto set my hand.

CHARLES F. THOMPSON.